H. G. ALDRIDGE.
SAW.
APPLICATION FILED FEB. 3, 1910.
964,602.
Patented July 19, 1910.
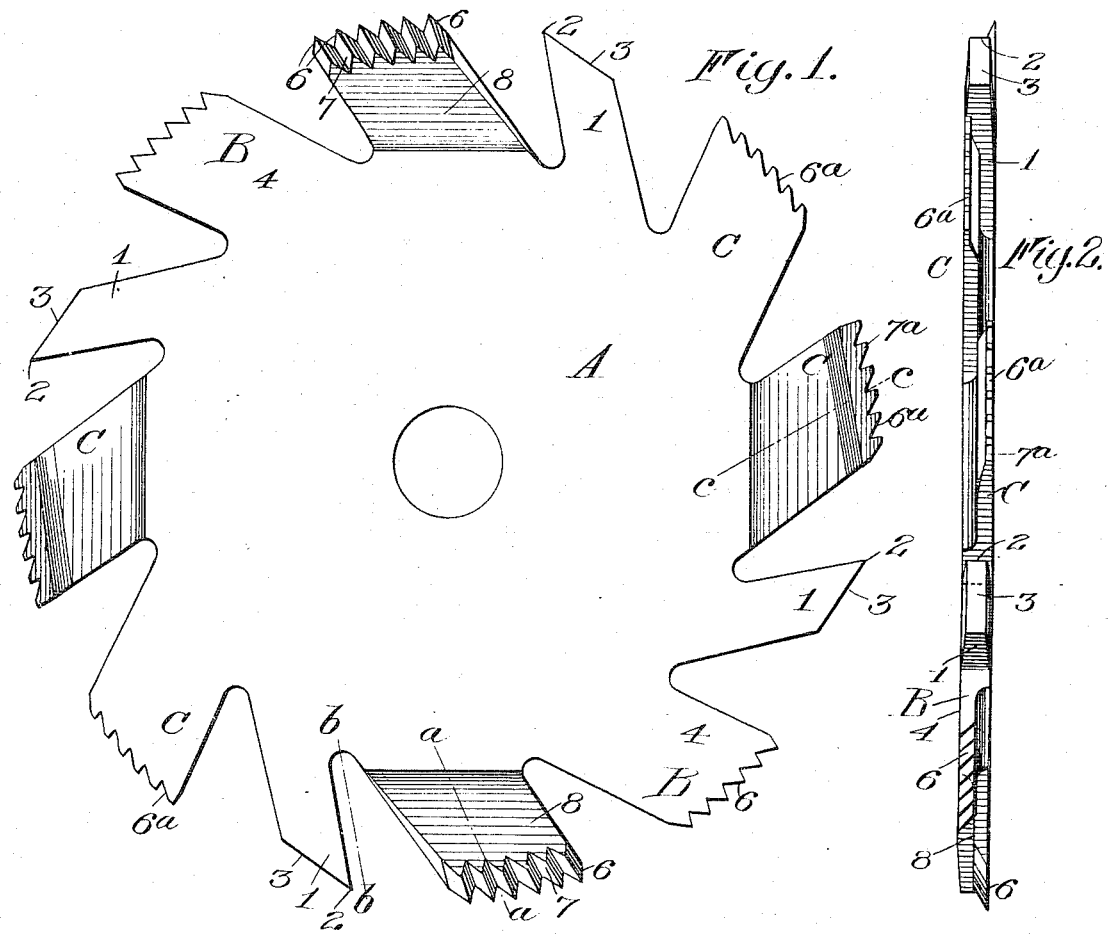
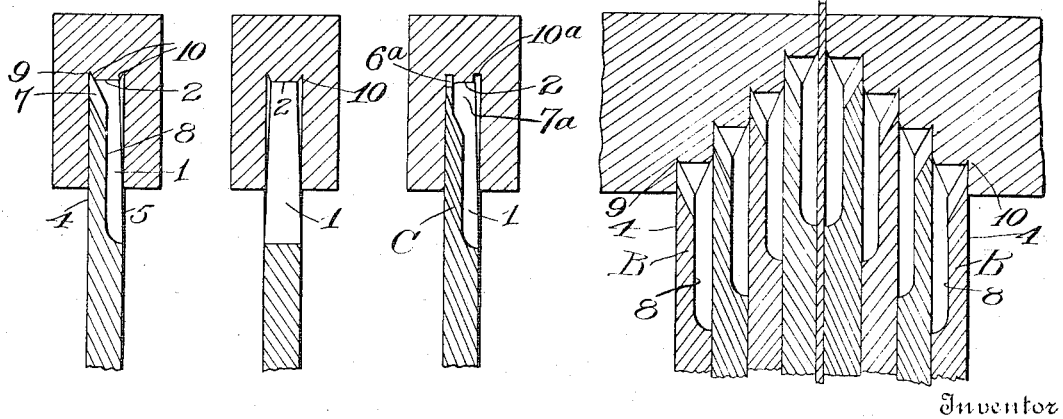
Witnesses
Walter B. Payne
H. H. Simms
Inventor
Harry G. Aldridge
By Church & Rich
his Attorneys

UNITED STATES PATENT OFFICE.

HARRY G. ALDRIDGE, OF ROCHESTER, NEW YORK, ASSIGNOR TO THE HUTHER BROS. SAW MFG. CO., OF ROCHESTER, NEW YORK, A CORPORATION OF NEW YORK.

SAW.

964,602.

Specification of Letters Patent. Patented July 19, 1910.

Application filed February 3, 1910. Serial No. 541,881.

*To all whom it may concern:*

Be it known that I, HARRY G. ALDRIDGE, of Rochester, in the county of Monroe and State of New York, have invented certain new and useful Improvements in Saws; and I do hereby declare the following to be a full, clear, and exact description of the same, reference being had to the accompanying drawings, forming a part of the specification, and to the reference-numerals marked thereon.

The present invention relates to saws and it has for an object to provide a construction having pockets on its teeth sides so formed that the wedging or packing of the chips cut by the teeth of the saw is obviated.

Another object of the invention is to improve a saw having beveled teeth so that the spreading of the teeth during the cutting is prevented.

To these and other ends the invention consists in certain improvements and combinations of parts all as will be hereinafter more fully described, the novel features being pointed out in the claims at the end of the specification.

In the drawings: Figure 1 is a side view of a circular saw for use in cutting heads embodying the present improvements; Fig. 2 is an edge view of the saw; Fig. 3 is a sectional view showing the manner in which the saw operates on a piece of material, the saw being shown in section on the line *a—a* of Fig. 1; Fig. 4 is a view similar to Fig. 3 with the saw in section on the line *b—b* of Fig. 1; Fig. 5 is a view similar to Figs. 3 and 4 with the saw in section on the line *c—c* of Fig. 1, and Fig. 6 shows a number of the saws in section operating upon a suitable work piece.

In certain types of saws such as circular saws used on cutting heads, the cutting teeth have been provided on their sides with pockets to permit the chippings to escape. These pockets have been so formed that a packing of the chippings takes place therein, thus preventing the escape of the chippings and destroying the function of the pockets. Such saws have also been provided with beveled teeth, and when these teeth are of any considerable length there is a tendency to make a groove which causes the teeth to gradually spread or move outwardly. The present invention not only obviates the packing of the chippings in the teeth pockets, but it shapes the grooves in such a manner that all spreading of the teeth is prevented.

In the embodiment of the invention herein shown, the body A carries a series of raker teeth 1 each of which has a width substantially equal to the width of the saw body and is provided with a cutting edge 2, a clearance face 3 extending rearwardly from the cutting edge. In addition to the series of raker teeth there may be provided two series of major teeth formed with minor teeth at their ends. One of said series of major teeth has the outer faces 4 of its members lying in the plane of one face of the saw body, while the teeth of the other series have their outer faces 5 lying in the plane of the opposite faces of the saw body so that the two series operate in different planes. The inner sides of each series of major teeth have bevels near their ends and on their minor teeth and faces 8 extending from the bases of the bevels throughout the greater portion of the lengths of the minor teeth to provide pockets for the chips cut by the minor teeth. The depth of each of these pockets throughout the greater portion of the length of each tooth is at least equal to its depth at the base of the bevel. In this instance the faces 8 are substantially parallel with the outer faces of the major teeth so that any material which enters the pockets will not become wedged therein between the faces 8 and the wall of the groove in the material, or when the saws are combined in the manner shown in Fig. 6 between the faces 8 and the adjacent saw blade or body.

In some of the major teeth of each series, as indicated at B, it is desired that the bevels 7 of the minor teeth 6 should extend from the pockets to the opposite or outer faces of the major teeth so that sharp edges 9 will be provided. In this instance the edges 9 are in the form of points and the grooves between the teeth have their walls inclined to the plane of the saw body. As the edges or points 9 cut in advance of the raker teeth, as will be seen in Figs. 3 to 6, wedge shaped grooves 10 are formed at the base and on opposite sides of the saw kerf. As the saw moves inwardly these grooves coöperate with the beveled portions of the teeth in such a manner that the latter are spread outwardly causing them to cut in an imperfect manner. This is especially noticeable when the major teeth are long and thin.

To overcome the spreading of the teeth, at least one major tooth C of each series has its minor teeth 6ª formed with their inner surfaces parallel to the outer face of the major tooth and the grooves between the minor teeth preferably have their walls extending perpendicularly to the plane of the minor teeth thereby making the minor teeth rectangular in cross section. Both the major and minor teeth 6 and 6ª operate at the same depth and farther from the center of the saw than the raker teeth 1, and in this way the teeth 6ª widen the groove 10 in the manner shown at 10ª in Fig. 5 so that it is impossible for the minor teeth 6 to coöperate with the walls of the grooves 10 in such a manner as to effect a spreading of the teeth, and the raker teeth remove the material which is left between the cuts made by the minor teeth 6ª. The parallel inner faces of the minor teeth 6ª extend but a short distance below them and in order not to weaken the major tooth C, unduly the latter, is made thicker the balance of its length, like the teeth B and providing a similar pocket for the escape of chips.

The saw may be used alone, as shown in Figs. 3 to 5, or may be assembled with others for forming any desired work piece, such as shown in Fig. 6. As the pockets are at least as great in depth throughout their greater portions as at the bevels or bases of the minor teeth any chippings which enter the pockets will not become packed therein, but may be discharged therefrom during the saw movement. The teeth C form the kerf in such a manner that the bevel teeth B cannot spread outwardly thus making it possible to secure neater and better work.

What I claim is:

1. A saw comprising a body provided with a tooth having a bevel on one side near its end, and a face extending from the base of the bevel throughout the greater portion of the length of the tooth, and set inwardly from the proximate side of the saw body to provide a pocket whose depth throughout the greater portion thereof is at least as great as that portion at the base of the bevel.

2. A saw comprising a body provided with a tooth having one side in a plane with one face of the saw body and the other side provided with a bevel at its end, and a face extending from the base of the bevel throughout the greater portion of the length of the tooth and set inwardly from the proximate face of the saw body to provide a pocket whose depth throughout its greater portion is at least as great as the depth of the pocket at the base of the bevel.

3. A saw comprising a body provided with at least two cutting teeth, one having a side in a plane with one face of the saw body and the other having a side in a plane with the opposite face of the saw body, the other side of each tooth having a bevel at its end and a face set inwardly from the proximate face of the saw body and extending from the bevel to provide a pocket whose depth throughout its greater portion is at least as great as the depth of the pocket at the base of the bevel.

4. A saw for use in cutting heads comprising a body provided with a tooth having one side in a plane with one face of the saw body and the other side provided with a bevel at its end, and a face parallel with the first mentioned side extending from the bevel throughout the greater portion of the tooth to provide a pocket.

5. A saw comprising a body having two series of major teeth arranged thereon and provided with beveled minor teeth at their ends, each member of one of the series of major teeth having one of its sides in a plane with one side of the saw body and the other side provided with a face set inwardly from the proximate face of the saw body and extending from the bevels throughout the greater portion of the tooth to provide a pocket whose depth throughout its greater portion is at least as great as its depth at the base of the bevel and each member of the other series of teeth having one of its sides in a plane with the opposite side of the saw body and formed on its other side with a pocket similar to the first named series.

6. A saw comprising at least one major tooth having minor teeth at its end all provided with sharp edges operating in a single plane, and a tooth wider than the minor teeth located in rear of the minor teeth and constructed to widen the groove cut by the minor teeth.

7. A saw comprising at least one major tooth having minor teeth at its end all provided with sharp edges operating in a single plane, and at least one major tooth having minor teeth wider than the minor teeth on the first named tooth and operating in a plane with the latter.

8. A saw comprising at least one major tooth having beveled minor teeth at its end, the bevels of all of which extend from one and the same side of the major tooth to the other to provide sharp edges operating in a single plane, and at least one major tooth having minor teeth at its ends, one side of which extends in a plane with the edge of the beveled teeth and the other side parallel thereto.

9. A saw comprising at least one major tooth with minor teeth at its ends all beveled on one and the same side of the major tooth to provide sharp points operating in a single plane and separated by grooves inclined to the plane of the saw body, and at least one major tooth with the ends of all its minor teeth operating in a plane with the plane of the first named minor teeth, having greater width than the ends of the minor teeth on the first named major tooth and separated by grooves perpendicular to the saw body.

10. A saw having two series of major teeth arranged to operate in different planes and provided with minor teeth at their ends, the ends of the minor teeth of each series operating in but one plane, the ends of the minor teeth of some of the major teeth of each series being sharp while those of the other major teeth are wider than the sharp ones.

11. A saw comprising a major tooth having one side in a plane with one face of the saw body and the other side set inwardly from the proximate face of the saw body to provide a pocket of substantially uniform width, and a portion at the end of the major tooth of reduced and uniform thickness, provided with minor teeth.

12. A saw comprising a body having two series of major teeth arranged thereon, each member of one of the series of major teeth having one side in a plane with one side of the saw body and the other side of the tooth set inwardly from the proximate side of the saw body to provide a pocket of substantially uniform width, each member of the other series of major teeth having one of its sides in a plane with the opposite side of the saw body and formed on its other side with a pocket similar to the first named series, part of the major teeth of each series being provided with beveled minor teeth on the side toward the pocket, and the remaining major teeth of each series being reduced near their ends on the side toward the pocket to provide minor teeth of uniform thickness, and raker teeth on the body shorter than the teeth of both series.

HARRY G. ALDRIDGE.

Witnesses:
RUSSELL B. GRIFFITH,
H. H. SIMMS.